Figure 1:
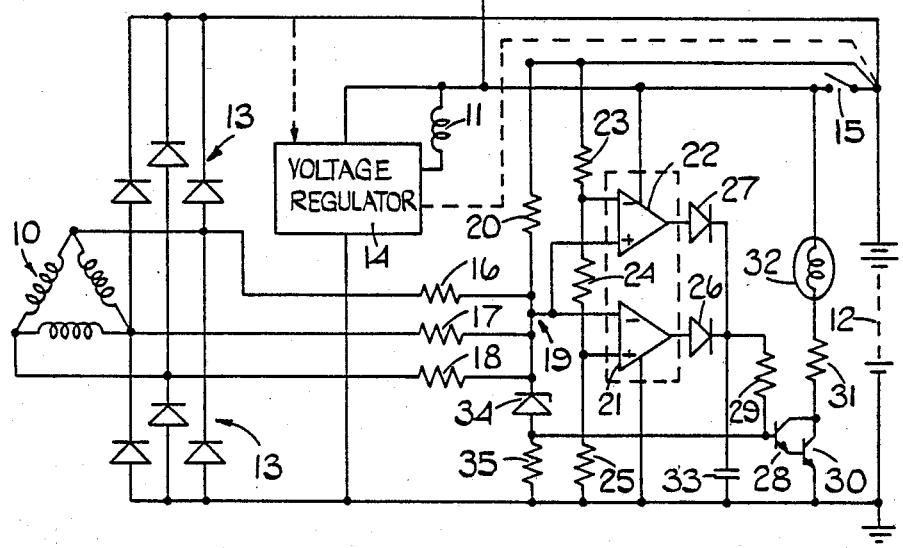

United States Patent [19]

Nichol

[11] 4,342,022
[45] Jul. 27, 1982

[54] WARNING LAMP ARRANGEMENTS FOR VEHICLE BATTERY CHARGING SYSTEMS

[75] Inventor: Thomas Nichol, Oxted, England

[73] Assignee: Lucas Industries Limited, Birmingham, England

[21] Appl. No.: 108,198

[22] Filed: Dec. 28, 1979

[30] Foreign Application Priority Data

Jan. 6, 1979 [GB] United Kingdom ............... 7900489

[51] Int. Cl.³ ............................................... G08B 21/00
[52] U.S. Cl. ............................... 340/52 R; 340/635; 340/511; 320/48
[58] Field of Search ........... 340/52 R, 510, 540, 340/635, 636, 645, 646, 648, 650, 651, 653, 657, 511; 320/48

[56] References Cited

U.S. PATENT DOCUMENTS

| | | | |
|---|---|---|---|
| 3,305,774 | 2/1967 | Heath | 340/635 |
| 3,656,135 | 4/1972 | Ruff | 320/48 |
| 3,764,879 | 10/1973 | Hill | 320/48 |
| 3,781,633 | 12/1973 | Iwaki et al. | 320/48 |
| 3,820,009 | 6/1974 | Itoh et al. | 320/48 |
| 3,855,517 | 12/1974 | Allport | 320/64 |
| 4,254,396 | 3/1981 | Saudax | 320/48 |

FOREIGN PATENT DOCUMENTS 1543484 9/1968 France.
1178383 1/1970 United Kingdom.

Primary Examiner—Alvin H. Waring
Attorney, Agent, or Firm—Ladas & Parry

[57] ABSTRACT

A warning lamp arrangement for a vehicle battery charging system comprises three resistors (16, 17, 18) connecting a point (19) to the output terminals of an alternator stator winding (10). The said point (19) is connected to the positive terminal of the battery (12) through a resistor (20) and to its negative terminal through a zener diode (34) and a resistor (35). A pair of comparators (21, 22) having their outputs connected to the base of a Darlington transistor (28, 30) detect if the voltage at the said point (19) is outside a predetermined range. The junction of the zener diode (34) and its as associated resistor (35) is also connected to the base of the Darlington transistor (28, 30). A warning lamp (32) connected in the collector circuit of the Darlington transistor is energized if the alternator does not produce an output or a malfunction occurs in the charging system.

5 Claims, 2 Drawing Figures

WARNING LAMP ARRANGEMENTS FOR VEHICLE BATTERY CHARGING SYSTEMS

This invention relates to warning lamp arrangements for vehicle battery charging systems.

The most commonly used conventional warning lamp arrangement includes a lamp connected in series with the vehicle ignition switch between the vehicle battery and an auxiliary output of an alternator, this auxiliary output being connected by the alternator field winding and the output stage of the alternator voltage regulator to an earth terminal. When the ignition switch is first closed, the alternator is producing no output, and the lamp is illuminated by current from the battery through the ignition switch, the lamp, the field winding and the voltage regulator output stage, such current also providing initial excitement of the field winding. When the alternator is running the auxiliary output increases to the battery voltage and there is then no voltage across the lamp.

Such a warning lamp arrangement provides an indication of only a limited range of the possible malfunctions which can occur in a battery charging system. Other warning lamp arrangements have been proposed to provide additional warning functions but none has been found to be altogether satisfactory.

It is an object of the invention to provide a warning lamp arrangement which is capable of indicating a wide range of faults.

A warning lamp arrangement in accordance with the invention comprises a resistor network having terminals for connection to junctions on the alternator armature winding and means sensitive to the voltage at a point in said network for illuminating a warning lamp when the voltage at said point is outside a predetermined range of voltages.

Preferably said voltage sensitive means comprises a pair of voltage comparators each having one input connected to said point and its other input connected to a respective one of two voltage reference sources providing voltage signals corresponding to the limits of said predetermined range of voltages. The outputs of said voltage comparators are preferably combined by means of diodes and applied to a warning lamp driver. The input of said warning lamp driver may include a capacitor arranged to charge relatively rapidly via one of the diodes when either voltage comparator detects excursion of the voltage at said point beyond the respective limit and to discharge relatively slowly.

The resistor network may also include a resistor for connecting said point to one terminal of the battery which is charged by the alternator so that said point is biased to a voltage outside said range of voltages when the alternator is not producing an output. In addition a zener diode and a further resistor in series may be connected for connecting said point to the other terminal of the battery, a connection being provided between said further resistor and the lamp driver so as to illuminate the lamp when said zener diode conducts even if the supply to the voltage comparators is interrupted.

In the accompanying drawings

Figure 2:
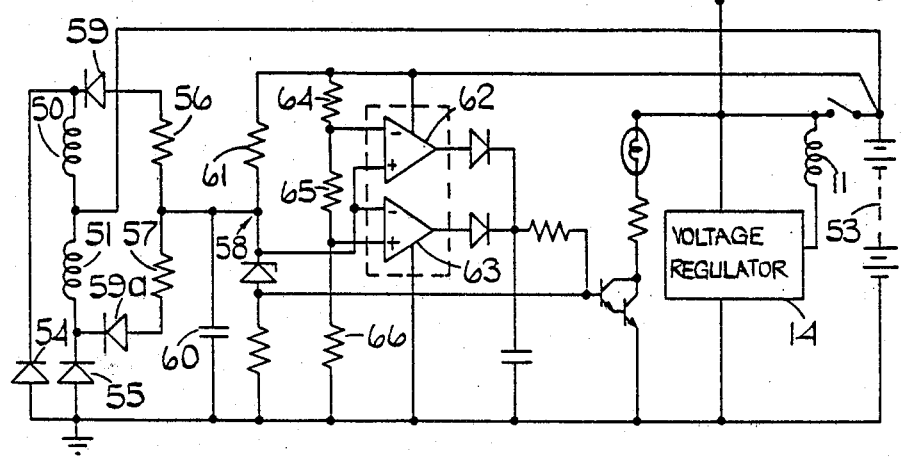

FIG. 1 is a circuit diagram illustrating the application of the invention to a system utilizing a three-phase alternator, and FIG. 2 is a circuit diagram, illustrating the application of the invention to a system utilizing a split winding single phase alternator.

Referring firstly to FIG. 1 of the drawings the battery charging system shown therein includes an alternator with a stator or armature winding 10 and a wound field 11, the field winding being energized by a voltage regulator 14 of well known type which switches the field current on and off according to the instantaneous value of the voltage of a battery 12 connected to the stator winding by a three-phase full wave rectifier 13.

It will be noted that the rectifier does not have at present conventional auxiliary output for providing current to the field winding, but the field winding is connected to the battery 12 by the vehicle ignition switch 15. The voltage regulator is shown with its voltage sensing input connected to the battery by the ignition switch, but other known arrangements (shown in broken lines on FIG. 1) using a separate voltage sensing lead connected to the battery or using a direct connection to the alternator output may alternatively be employed.

The warning lamp arrangement used in the system shown in FIG. 1 employs a resistor network including three resistors 16, 17 and 18 connecting the a.c. output terminals of the alternator to a point 19 and a resistor 20 connecting this point to the positive battery terminal. The three resistors 16, 17 and 18 are of equal ohmic value and resistor 20 is of relatively high ohmic value so as to be significant only when the alternator is producing no output, and acting, in those circumstances, to bias the point 19 to the positive battery voltage.

The point 19 is connected to the inverting input of a voltage comparator 21 and to the non-inverting input of a voltage comparator 22. A resistor chain consisting of three resistors 23, 24 and 25 in series is connected between the positive battery terminal and ground, resistor 24 being of ohmic value larger than that of resistors 23 and 25 which are equal. The junction of resistors 23 and 24 is connected to the inverting input of comparator 22, and the junction of resistors 24 and 25 is connected to the non-inverting input of a comparator 21. The outputs of the two comparators 21, 22 are connected respectively to the anodes of two diodes 26, 27, the cathodes of which are connected together and to the input of a lamp drive circuit.

This lamp driver circuit includes an npn darlington pair the input transistor 28 of which has its base connected by a resistor 29 to the cathodes of the diodes 26, 27. The emitter of the transistor 28 is connected to the base of the output transistor 30, the emitter of which is connected to ground. The collectors of the transistors 28, 30 and connected together and, by a resistor 31 and warning lamp 32, in series, to the battery positive terminal via the ignition switch 15. At the input of the lamp driver circuit there is a capacitor 33 connected between the cathodes of the diodes 26, 27 and ground.

A zener diode 34 has its cathode connected to the point 19 and its anode connected via a resistor 35 to ground. The anode of the zener diode is also connected to the base of the transistor 28. The capacitor 33 can discharge completely through the resistors 29 and 35 in series provided neither comparator output is high and zener diode 34 is nonconductive.

In normal operation the voltage at the point 19 varies between two-thirds of a battery voltage and one-third of battery voltage at a frequency dependent on the speed of running of the alternator. In these circumstances, the voltage at point 19 always falls within the limits set by the resistance chain 23, 24, 25 so that the outputs of both comparators remain low. The breakdown voltage of the zener diode 34 is more than two-thirds of the battery voltage and this, therefore, does not conduct, so that capacitor 33 remains discharged and transistors 28 and 30 do not turn on.

If a fault occurs in one (or two) of the phases of the alternator, then the balance of the phases will be disturbed and the voltage at point 19 will periodically fall outside the predetermined limits. Each time the voltage at point 19 exceeds two thirds battery voltage or falls below one third battery voltage the output of the appropriate comparator 21, 22 will go high, rapidly charging capacitor 33 and turning on the transistors 28, 30. The lamp 32 will then be continuously illuminated since-capacitor 33 discharges relatively slowly through the resistor 29.

If the alternator does not produce an output, either as a result of the engine being stopped, or as a result of an open circuit fault in the field winding, brushes or regulator, the resistor 20 causes the voltage at point 19 to rise, thereby turning on the comparator 22 and causing the lamp 32 to be illuminated.

If there is a short circuit fault in the regulator so that field current is conducted continuously, the amplitude of the signal at the point 19 will increase and lamp 32 will be turned on during each half cycle of the alternator output via zener diode 34 and resistor 35. As the zener diode 34 conducts weakly, the lamp 32 will only be weakly turned on.

All of the components included in the warning lamp circuit are preferably included in an integrated or hybrid circuit package associated with the regulator 14, the lamp 32 being remote from the regulator and independently connected to the ignition switch. Thus, should the connection between the ignition switch and the regulator be severed, the lamp 32 will still light, because in the absence of field current the alternator will not produce a significant output and transistors 28, 30 will be turned on via zener diode 34. The same is true when the circuit shown is used in a system where a relay controlled by the ignition switch is used to connect the regulator to the battery, in which case failure of the relay will also cause the lamp to be lit whenever the ignition switch is closed.

If the current drains from the battery is unlikely to cause problems, the comparators 21, 22 may be connected directly to the battery instead of to the ignition switch as shown in the drawing.

Turning now to FIG. 2, the circuit diagram shows a split-phase single phase alternator with a stator or armature winding in two parts 50, 51 in series. The common point of the two parts of the stator winding is connected to the positive terminal of the battery 53. The two ends of the stator winding are connected to the cathodes of two diodes 54, 55 the anodes of which are connected to earth. The alternator as before has a wound field 11 controlled by a voltage regulator 14.

The cathodes of the diodes 54, 55 are also connected by two equal value resistors 56, 57 in series with diodes 59, 59a to a point 58 corresponding to the point 19 in FIG. 1. A third resistor 61 of value equal to that of each resistor 56, 57 connects the point 58 to the battery $+v_e$ terminal. A capacitor 60 is connected between point 58 and earth. The point 58 is connected to the inputs of two comparators 62, 63 corresponding to comparators 22, 21 and a resistor chain 64, 65, 66 provides reference voltage inputs to the comparators. In this case the resistors 64 and 66 are of equal value and resistor 65 is of a somewhat lower value.

The lamp drive circuit in FIG. 2 is the same as that shown in FIG. 1 and will not be re-described.

The voltage at point 58 in FIG. 2 fluctuates in normal properly balanced operation within a limited range about half battery voltage. As in FIG. 1 any excursion of the voltage outside this range causes one or other of the comparator outputs to go high, thereby illuminating the lamp. The cpacitor 60 improves the noise immunity of the circuit particularly at low speeds when the wave form at point 58 approximates to a sine wave.

The diodes 59, 59a ensure that there is no current drainage through resistors 56, 57 and the stator winding when the system is not operating.

Although the present invention has been described as applied to an alternator having a delta connected stator winding and an alternator having a split phase stator winding, it could also be applied to alternators having other types of stator windings, such a star connected winding.

I claim:

1. A warning lamp arrangement for a vehicle battery charging system including an alternator having an armature winding, a resistor network comprising a plurality of resistors, one end of each resistor being connected to a respective output phase of the armature winding and the other end being connected to a common point, and means sensitive to the voltage waveform at said common point for illuminating a warning lamp when the voltage waveforms exceeds its normal amplitude relationship to the battery voltage, said voltage sensitive means comprising a pair of voltage comparators and a pair of voltage reference sources defining said normal amplitude relationship, and each comparator having one input connected to said common point and its other input connected to a respective one of said voltage reference sources.

2. An arrangement according to claim 1 including a warning lamp driver and a diode for applying the output of each comparator to the warning lamp driver.

3. An arrangement according to claim 2 in which the input of said warning lamp driver includes a capacitor arranged to charge relatively rapidly via one of the diodes when either voltage comparator detects an excursion of the voltage at said point beyond the respective limit and to discharge relatively slowly.

4. An arrangement according to claim 1 or 3 or 4 further including a resistor for connecting said point to one terminal of the battery which is charged by the alternator so that said point is biased to a voltage outside said normal amplitude relationship when the alternator is not producing an output.

5. An arrangement according to claim 2 further including a resistor for connecting said point to one terminal of the battery which is charged by the alternator so that said point is biased to a voltage outside said normal amplitude relationship when the alternator is not producing an output, and a zener diode and a further resistor connected in series for connecting said point to the other terminal of the battery, a connection being provided between said further resistor and the lamp driver so as to illuminate the lamp when the zener diode conducts even if the supply to the voltage comparator is interrupted.

* * * * *